United States Patent
Sherwin

(10) Patent No.: US 7,813,094 B1
(45) Date of Patent: Oct. 12, 2010

(54) INPUT-VOLTAGE-RATE-OF-CHANGE-DEPENDENT CURRENT-LIMIT SET POINT FOR HOT-SWAP CONTROLLERS

(75) Inventor: James S. Sherwin, Hillsborough, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 773 days.

(21) Appl. No.: 11/713,537

(22) Filed: Feb. 28, 2007

(51) Int. Cl.
*H02H 3/08* (2006.01)
*H02H 9/02* (2006.01)
(52) U.S. Cl. .................. 361/93.1; 361/93.8; 361/42
(58) Field of Classification Search ............ 361/93.1, 361/93.8, 42
See application file for complete search history.

(56) References Cited

U.S. PATENT DOCUMENTS

| | | | | |
|---|---|---|---|---|
| 2,920,242 | A * | 1/1960 | Koss ........................... | 361/94 |
| 5,436,784 | A * | 7/1995 | Schweitzer et al. ........... | 361/25 |
| 6,639,768 | B2 * | 10/2003 | Zuercher et al. .............. | 361/42 |
| 6,816,352 | B2 * | 11/2004 | Hoopes ........................ | 361/104 |
| 6,917,504 | B2 * | 7/2005 | Nguyen et al. ............... | 361/100 |
| 7,123,457 | B2 * | 10/2006 | Schweitzer et al. ........... | 361/25 |

\* cited by examiner

*Primary Examiner*—Stephen W Jackson
*Assistant Examiner*—Zeev Kitov
(74) *Attorney, Agent, or Firm*—TIPS Group

(57) ABSTRACT

Certain exemplary embodiments disclosed herein include an adaptive current limiter comprising a variable reference voltage generator which is coupled to a power source via two input nodes and which develops a voltage step with exponential decay in response to, for example, a transient over-voltage condition, with the output of the variable reference voltage generator supplying a reference voltage to a comparator which compares the reference voltage to a voltage derived from a sensing resistor and, upon detecting an over-voltage condition, signals to a circuit breaker that the circuit should be broken or modified.

8 Claims, 6 Drawing Sheets

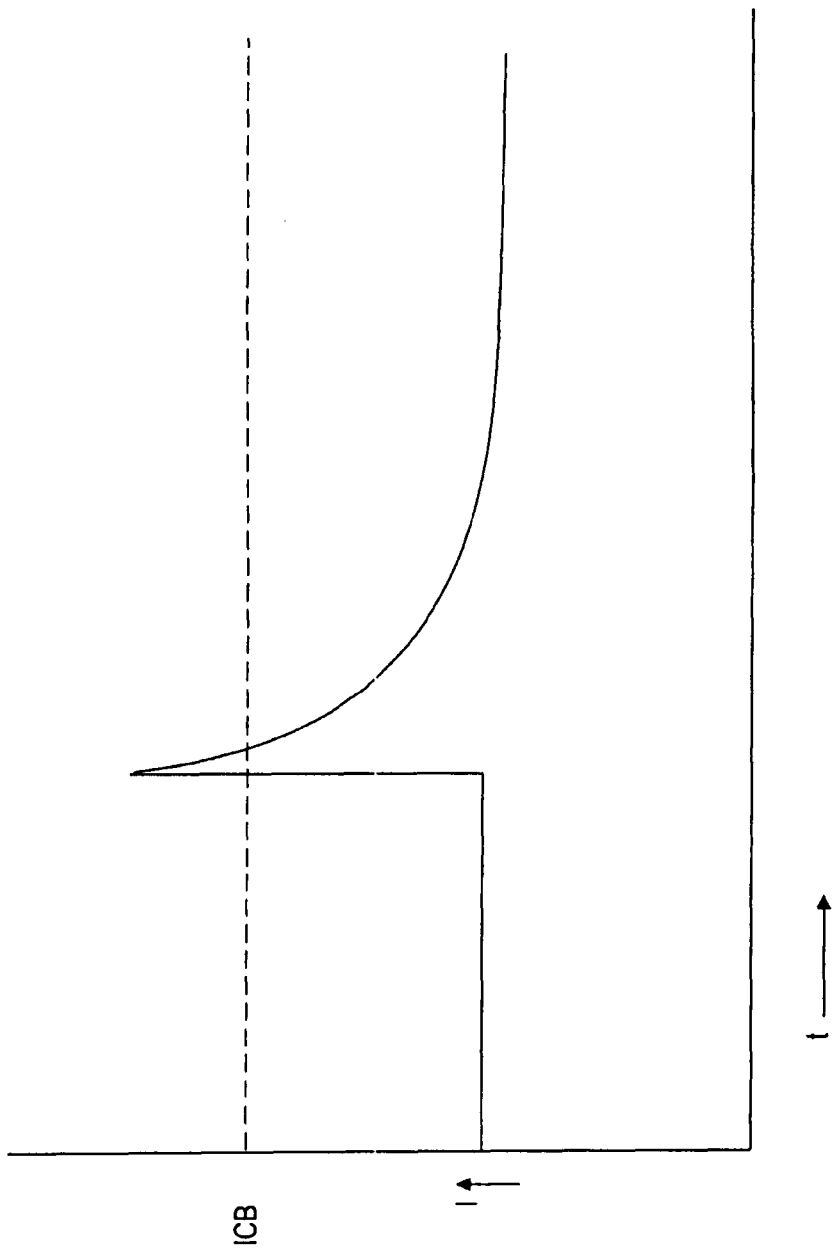
FIG. 3
(PriorArt)

INPUT-VOLTAGE-RATE-OF-CHANGE-DEPENDENT CURRENT-LIMIT SET POINT FOR HOT-SWAP CONTROLLERS

BACKGROUND

Exemplary embodiments disclosed herein pertain to current limiters, such as circuit breakers. More particularly, exemplary embodiments disclosed herein pertain to current limiters in an environment which may induce transient surges.

FIG. 1 is a schematic diagram wherein a prior art telecommunications power card 2 is depicted. The purpose of telecommunications power card 2 is to provide constant voltage to a load that is connected to it.

On the exterior of the card, common node 4 and negative $V_{IN}$ node 6 are disposed to connect to a voltage source providing, for example, −48 volts. The term "node" refers to any equipotential point in an electrical device, either at a terminus, or not at a terminus. Voltage sources of −48 volts are widely used in telecommunications applications; nearly all telephone central offices are powered from −48 volt sources wherein the "hot" side of the supply is negative with respect to ground.

Hot swap controller 8 is disposed on prior art telecommunications power card 2, and is coupled to positive ground node 4 and negative $V_{IN}$ node 6 from which it derives approximately −48 volts when connected to an active power source providing −48 volts. Hot swapping (also known as hot plugging) is the ability to add, remove and replace components of a system while the system is powered. In the context of telecommunications applications, the hot swapping of power sources, such as batteries or power supplies, is commonly performed.

Capacitor 10 is electrically coupled to hot swap controller 8 at nodes 12 and 14. Increases of voltage correspondingly store excess charge in the capacitor, thus moderating the change in output voltage and current induced by a transient power event.

Since it is desirable to provide less than the −48V input for a load that is coupled to telecommunications power card 2, (e.g. +3.3 volts), a DC to DC converter 16 is provided on telecommunications power card 2 and is electrically coupled to hot swap controller 8 at nodes 12 and 14. Thus, capacitor 10 and DC to DC converter 16 are arranged in parallel fashion. DC to DC converter 16 is a load with respect to the power output of hot swap controller 8.

In electrical engineering, a DC to DC converter is a circuit which converts a source of direct current from one voltage to another. A DC to DC converter may serve to isolate an input power source (i.e. hot swap controller 8 from the load connected to the output of the DC to DC converter at common node 18 and $V_{OUT}$ node 20. DC to DC converters are commercially available as blocks or modules from Datel, Power Trends, Integrated Power Designs, or others.

FIG. 2 is a schematic diagram which depicts one form of a current limiter 22 of the prior art. Current limiter 22 is coupled to common node 4 and negative $V_{IN}$ node 6. These nodes provide power to the current limiter 22 which in turn provides power to the DC-DC converter 16 via $V_{OUT}$ node 24 and common node 4. Current source 26 is coupled to common node 4, and provides a constant reference current. It is comprised of voltage reference source 28 resistor R1, amplifier 30, and transistor 32 which are arranged in a well known configuration to provide constant current I1 based on the reference voltage provided by voltage reference source 28. Note that in FIG. 2, voltages are referred to $-V_{IN}$ at node 6.

Resistor R2 is coupled to current source 26 at node 34 and to negative $V_{IN}$ node 6. The constant current provided by current source 26 flows through resistor R2 producing reference voltage V1 across resistor R2 such that:

$$V1 = I1 \cdot R2$$

Resistor $R_{SENSE}$ is coupled to negative $V_{IN}$ node 6 and to pass transistor 36 which acts as a circuit breaker at node 38. When the circuit is not broken by pass transistor 36, current flows between $V_{OUT}$ node 24 and negative $V_{IN}$ node 6. The purpose of resistor $R_{SENSE}$ is to sense the current 12 flowing between negative $V_{IN}$ node 6 and $V_{OUT}$ node 24 and produce a voltage $V_{SENSE}$ at node 38 such that:

$$V_{SENSE} = I2 \cdot R_{SENSE}$$

Comparator 40 is coupled to node 34 and to node 38 such that it compares voltage $V_{SENSE}$ to voltage V1. The output of comparator 40 is coupled to latch 42 indicating when the circuit should be broken or modified. During normal operation, $V_{SENSE}$ is less than V1, so comparator 40 signals that the circuit should not be broken. When $V_{SENSE}$ exceeds V1, comparator 40 signals that the circuit should be broken or modified in some way.

Constant current I1 is only a small fraction of the current limit. R2 can be chosen to produce the reference voltage corresponding to the desired limit for current I2 as sensed by resistor $R_{SENSE}$. Since the resistance value of R2 is multiplied by constant current I1, higher reference voltages can be achieved by increasing the resistance value of R2.

Latch 42 is coupled to the output of comparator 40 and to pass transistor 36. When comparator 40 signals that the circuit should be broken, latch 42 propogates the signal to pass transistor 36, breaking the circuit. Latch 42 maintains the signal to break the circuit until receiving a reset signal via reset node 44. As will be appreciated by those skilled in the art, there are many alternatives to Latch 42 for various applications.

FIG. 3 is a graph depicting a constant-current threshold current limiter of the prior art. In FIG. 3, the vertical axis indicates current level and the horizontal axis indicates time increasing from left to right. The dashed line labeled ICB represents a constant-current threshold in common use. When this threshold is exceeded, it is an indication that the circuit breaker must interrupt current flow between the power source and the load. The solid line in FIG. 3 depicts an example of a current level which is initially constant. At a certain point in time, the current level suddenly surges to a dramatically higher level, which is above the constant current limit.

Since the current level exceeds the constant-current threshold, the circuit is broken. In some cases, this is undesirable. For example, if an additional power source is brought online, the voltage of the combined power sources may suddenly increase. Since a smoothing capacitor is typically coupled in parallel with the power supply and the load, the capacitor begins charging to the new voltage. The transient increase in current caused by the capacitor charging to the new voltage causes the circuit to break prematurely. Although the current surge may be relatively brief, and the current level decays exponentially as the capacitor approaches the new voltage, it can cause premature circuit breakage because the design of the prior art constant-current threshold circuit breaker is unforgiving.

One approach to this problem is to provide a current limiter which is temporarily disabled, for a fixed amount of time, to allow for a transient surge. This approach has the disadvantage that it does not protect the load from a damaging current surge such as that induced by a lightning strike or other dramatic power event. What is needed is a current limiter which is continuously online in order to protect the load, but which handles the transient surge caused by bringing a new or additional power source online; the prior art fails to properly address this problem.

These and other limitations of the prior art will become apparent to those of skill in the art upon a reading of the following descriptions and a study of the several figures of the drawing.

SUMMARY

Certain exemplary embodiments disclosed herein include an adaptive current limiter comprising a variable reference voltage generator which is coupled to a power source via two input nodes and which develops a voltage step with exponential decay in response to a transient over-voltage condition, with the output of the variable reference voltage generator supplying a reference voltage to a comparator which compares the reference voltage to a voltage derived from a sensing resistor and, upon detecting an over-voltage condition, signals to a circuit breaker that the circuit should be broken. By "transient condition" or "transient surge" it is meant that a transient condition and/or surge comprising one or more of an over-voltage condition and/or surge and or over-current condition and/or surge has occurred.

Further non-limiting exemplary embodiments include in various combinations (and subsets) a second variable reference voltage provided by the variable reference voltage generator which is different from the first variable reference voltage, a second comparator coupled to the second variable reference voltage, a variable current source which is part of the variable reference voltage generator wherein the variable current source has a differential input which is coupled to an RC circuit, a series connection of a charging resistor coupled to said first differential input and a capacitor coupled to one of the input power nodes, a directional valve which may comprise, for example a diode coupling the capacitor to the power input node, and a shunt resistor coupled in parallel with the directional valve, and an amplifier (which is part of the variable current source) with a differential input coupled to a power input node by a series connection of a reference voltage source and a resistor.

In another exemplary embodiment the amplifier has a second differential input and the variable voltage source further comprises the series connection of a resistor, a valve, and a second resistor coupled between the two power input nodes, where the second differential input is coupled to a node between the second resistor and the valve, and where an output of the variable voltage source at a node between the valve and the first resistor.

Another non-limiting exemplary embodiment includes a method for controlling a circuit breaker comprising detecting an over-threshold condition for current flowing through a circuit breaker and temporarily increasing the current threshold of the circuit breaker to prevent tripping said circuit breaker for transient surges less than a maximum magnitude. In some exemplary embodiments the transient surge is no greater that 1 second. Other embodiments further limit the current surge to 100 milli-second, 10 milli-seconds, and 1 milli-second respectively.

Some non-limiting exemplary embodiments include in various combinations (and subsets) variations of the method in which the duration of the temporary threshold increase is greater than the duration of an expected acceptable transient surge, the shape of the temporary increase of the threshold is that of a decaying step function, and the decaying step function is exponentially decaying. In some exemplary embodiments of the method, the decaying step function is developed, at least in part, by an RC circuit.

Still other non-limiting exemplary embodiments include a circuit for controlling a circuit breaker comprising means for detecting a transient surge of current flowing through a circuit breaker and means for temporarily increasing the current threshold of the circuit breaker to prevent tripping said circuit breaker by transient surges of less than a maximum value. In some cases the temporarily increased current threshold takes the form of an exponentially decaying step function.

An advantage of the exemplary current limiter disclosed herein is that current surges that accompany the charging of a smoothing capacitor when an additional power source is brought online are robustly handled without premature circuit breakage, and without interrupting the continuous operation of the current limiter. Another advantage is that the shape of the current-limit threshold matches that of the current surge accompanying the charging of the smoothing capacitor.

Applications of the exemplary current limiter herein described include almost any hot-swap controller application, but especially include telecom circuits where the input voltage at battery change may cause a step increase from 32-60V. One exemplary application is for response to large input-voltage step changes. Other applications include, by way of example and not limitation, applications which pertain to the initial turn-on of the hot-swap controller when the input voltage is steady yet the output capacitor must be charged at turn on.

The non-limiting exemplary embodiments set forth herein are for negative-voltage controllers, but similar circuits of inverse polarity are contemplated which are applicable to positive-voltage controllers.

These and other embodiments and advantages of the adaptive current limiter and other features disclosed herein will become apparent to those of skill in the art upon a reading of the following description and a study of the several figures of the drawing.

BRIEF DESCRIPTION OF THE DRAWINGS

Several exemplary embodiments will now be described with reference to the drawings, wherein like components are provided with like reference numerals. The exemplary embodiments are intended to illustrate, but not to limit, the invention. The drawings include the following figures:

FIG. 3 is a diagram depicting the operation of the current limiter of the prior art with respect to a transient power event such as that induced by the addition of a power source;

DETAILED DESCRIPTION OF EXEMPLARY EMBODIMENTS

Figure 1:
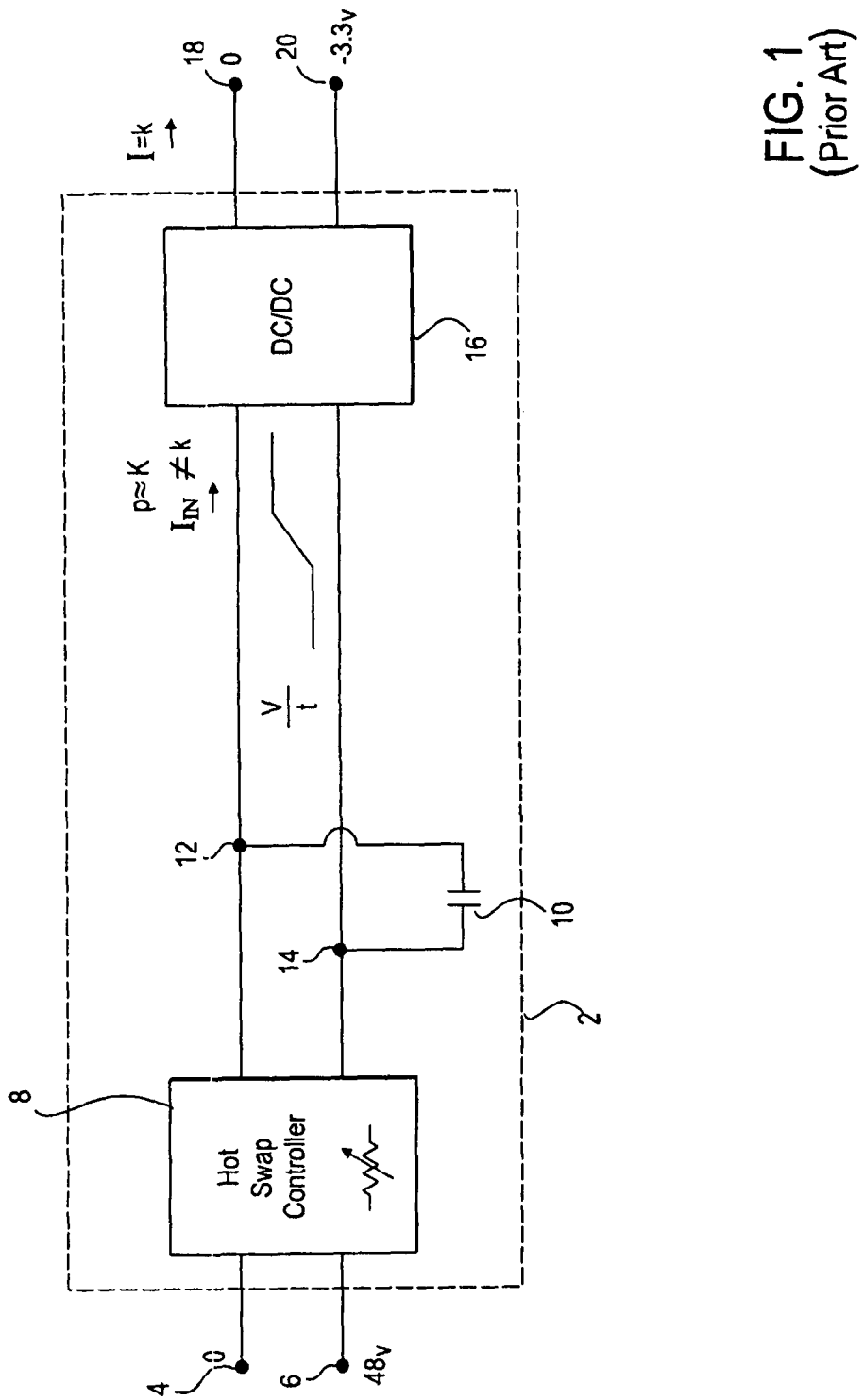
FIG. 1 is a schematic block diagram depicting a telecommunications power card of the prior art.
Figure 2:
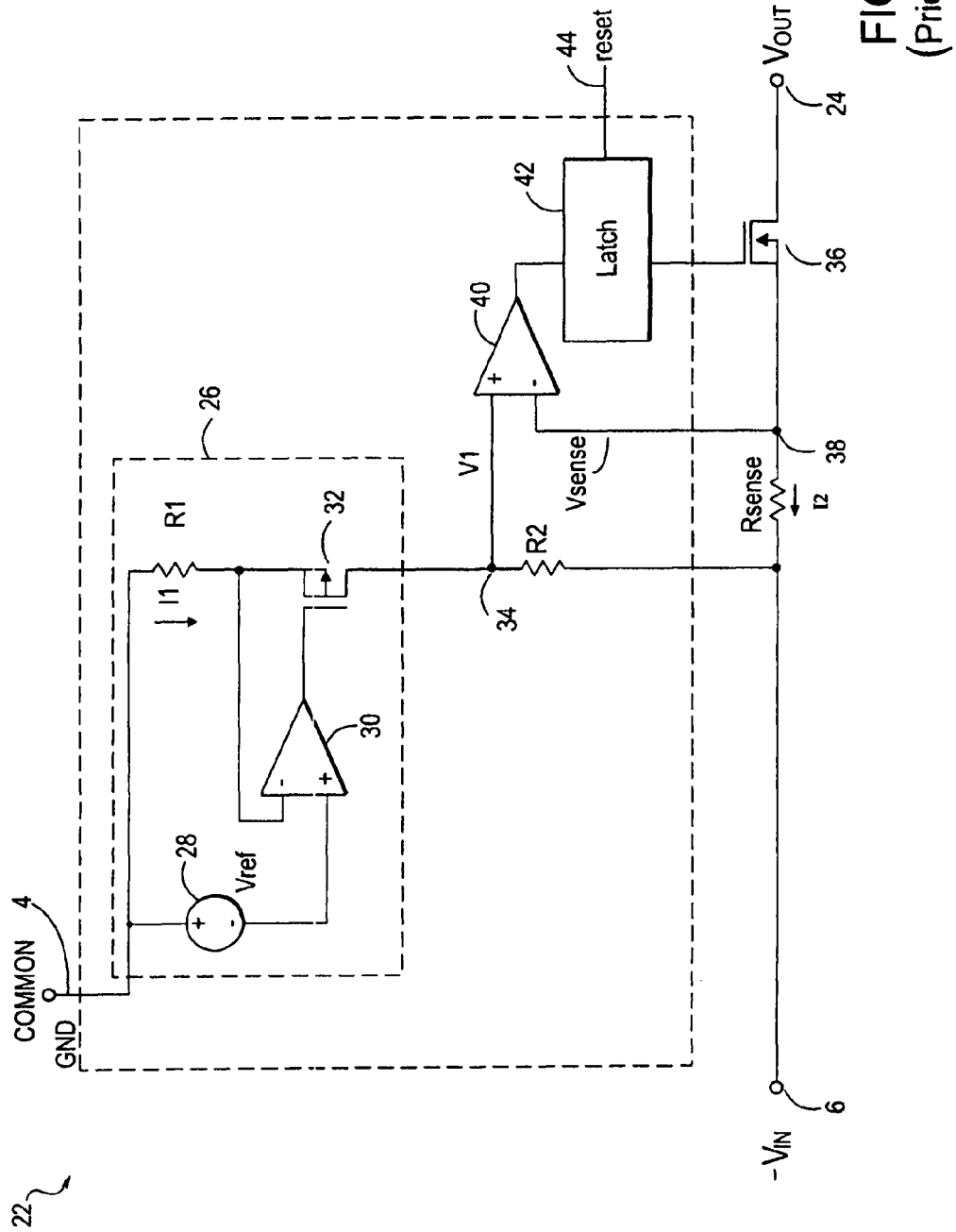
FIG. 2 is a schematic diagram which depicts one form of a current limiter of the prior art.
Figure 4:
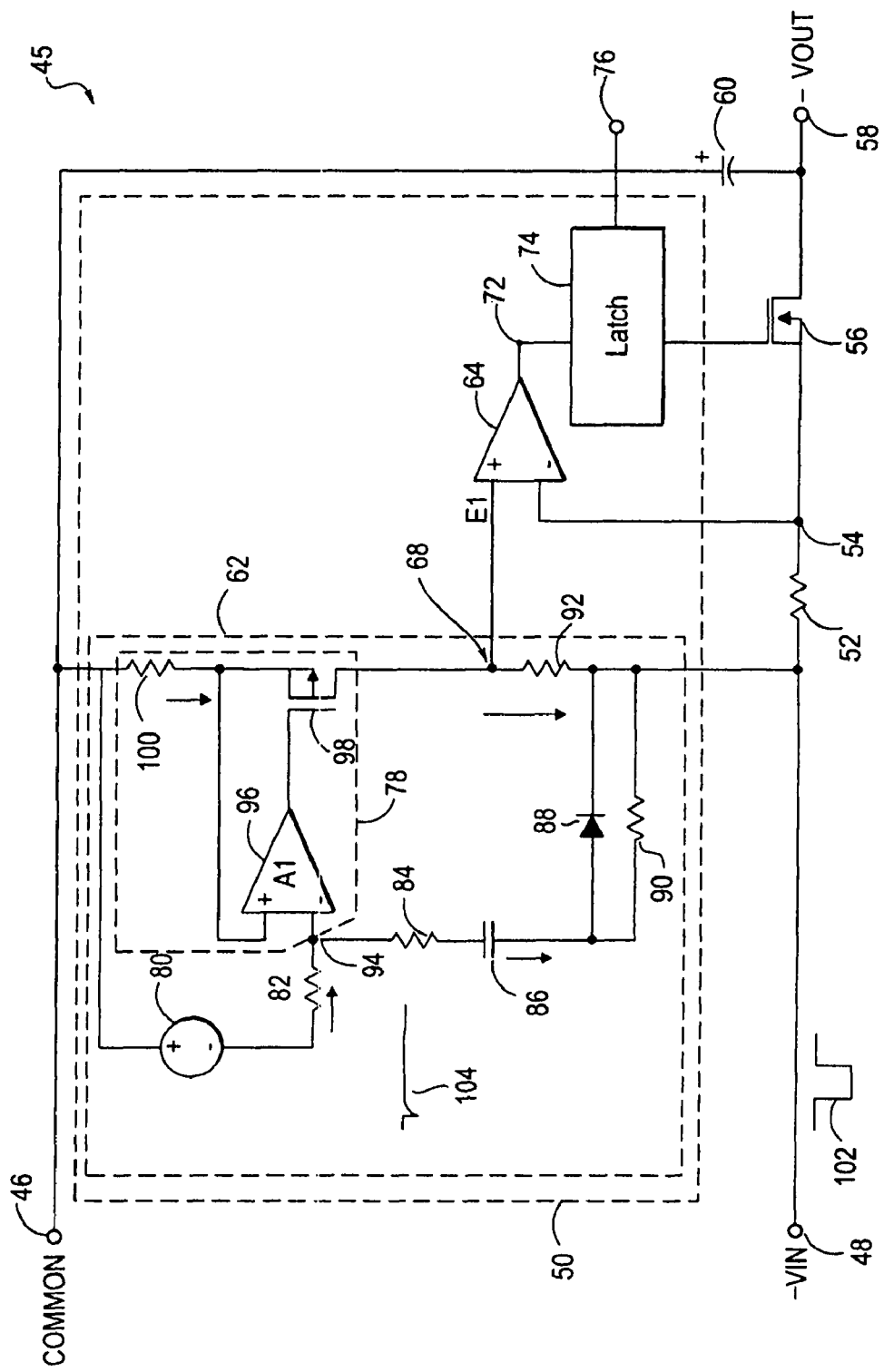
FIG. 4 is a schematic diagram which depicts an exemplary adaptive current limiter.

FIG. 4 is a schematic diagram depicting an exemplary adaptive current limiter 45 which is robust with respect to transient surges, such as that which is induced by, for example, the addition of a power source.

Common ground node 46 and negative VIN node 48 provide power from an external source. Integrated circuit 50 is coupled between common ground node 46 and to negative VIN node 48.

Sense resistor 52 is coupled to negative VIN node 48, and at a node 54 to a MOSFET pass transistor 56 which acts as a circuit breaker. MOSFET pass transistor 56 is also coupled to negative VOUT node 58. As will be appreciated by those skilled in the art, electron current flows between negative VIN node 48 and negative VOUT node 58 through sense resistor 52 and MOSFET pass transistor 56 until current flow is interrupted by MOSFET pass transistor 56.

Integrated circuit 50 is coupled to node 54 from which it derives a voltage which is proportional to the electron current flowing between negative VIN node 48 and negative VOUT node 58. Integrated circuit 50 is also coupled to the gate of MOSFET pass transistor 56 whereby it signals at an appropriate time to MOSFET pass transistor 56 that the circuit should be broken.

A smoothing capacitor 60 is coupled between negative VIN node 48 and common ground node 46, and thus is disposed in parallel with the power source(s), integrated circuit 50, and the load. During normal operation, capacitor 60 charges to and maintains equilibrium with the voltage between negative VIN node 48 and common ground node 46. As an additional power source such as a battery is brought online, the potential between negative VIN node 48 and common ground node 46 increases as a step function. The differential between the voltage of the present charge of capacitor 60 and the added potential between negative VIN node 48 and common ground node 46 causes the capacitor 60 to begin to charge.

As is well known to those skilled in the art, when a battery is connected to a series resistor and capacitor, the initial current is high as the battery transports charge from one plate of the capacitor to the other. The charging current asymptotically approaches zero as the capacitor becomes charged to the new voltage as expressed by the following well known equation:

$$I = \frac{V}{R} e^{-t/RC}$$

In certain non-limiting exemplary embodiments, integrated circuit 50 is comprised of a variable reference voltage generator 62, a comparator 64, and a latch 74. Variable reference voltage generator 62 is coupled between common ground node 46 and to negative VIN node 48. An output of variable reference voltage generator 62 is coupled at node 68 to a positive side of comparator 64. A reference voltage E1 which is proportional to the variable current limit is provided at node 68 to comparator 64. Comparator 64 is also coupled at node 54 to sense resistor 52 from which it derives a voltage VSENSE proportional to the electron current flowing between negative VIN node 48 and negative VOUT node 58 through sense resistor 52 and MOSFET pass transistor 56.

An output of comparator 64 is coupled at node 72 to an exemplary non-limiting application-specific latch 74. Comparator 64 compares E1 to VSENSE. When VSENSE matches or exceeds E1, comparator 64 signals via node 72 that an over-voltage condition has been reached and that the circuit should be broken. Exemplary non-limiting application-specific latch 74 propagates this signal to MOSFET pass transistor 56 which breaks the circuit. Upon receiving a signal from a reset node 76, the circuit is restored as non-limiting application-specific latch 74 signals to MOSFET pass transistor 56 that the reset signal has been received. As will be appreciated by those skilled in the art, there are innumerable applications which call for various alternate embodiments in place of non-limiting application-specific latch 74.

In certain non-limiting exemplary embodiments, variable reference voltage generator 62 is comprised of a variable current source 78, a fixed voltage source 80, resistors 82 and 84 which comprise a voltage divider 85, capacitor 86, diode 88, discharge resistor 90, and shunt resistor 92.

Exemplary variable current source 78 is coupled to common ground node 46 and to node 68, and generates current proportional to a reference voltage obtained at node 94 from voltage divider 85. The current generated by variable current source 78 flows via node 68 through shunt resistor 92 which produces at node 68 a variable reference voltage proportional to said current.

Variable current source 78 is comprised of amplifier 96, MOSFET 98, and resistor 100 arranged as a current source as shown. Resistor 100 is coupled to common ground node 46 on one side and to the source of MOSFET 98 and a positive input of amplifier 96 on the other side. An output of amplifier 96 is coupled to the gate of MOSFET 98. The drain of MOSFET 98 is coupled to node 68.

Fixed voltage source 80 is coupled on its positive side to common ground node 46, and on its negative side to resistor 82. Resistor 82 is coupled to resistor 84 in series; together resistors 82 and 84 comprise a voltage divider 85, the output of which is coupled to variable current source 78, and more particularly to a negative input of amplifier 96. Voltage divider 85 is coupled in series to capacitor 86 and discharge resistor 90 which is coupled to negative VIN node 48. Diode 88 is coupled in parallel with discharge resistor 90 with its anode coupled to capacitor 86 and its cathode coupled to negative VIN node 48.

The magnitude of current generated by variable current source 78 may be modified by changing the reference voltage at node 94 which is coupled to the negative input of amplifier 96. When a transient current begins flowing in resistor 82, a transient voltage is developed across resistor 82. This voltage is summed with the voltage supplied by fixed voltage source 80 such that the voltage appearing at the (−) input to amplifier 96 increases in a transient manner, and causes the current output by variable current source 78 to increase in a transient manner reflecting the voltage transient at the (−) input to amplifier 96. This causes the offset voltage E1 supplied to the (+) input of comparator 64 at node 68 to increase in similar transient character to the increased voltage developed in resistor 82. Thus, the current-limit trip point is increased to allow increasing current to charge the output capacitance without causing a current-limit fault when the input voltage between common ground node 46 and negative VIN node 48 suddenly increases.

Diode 88 is placed in the circuit to limit the transient increase only to the condition where the transient voltage at negative VIN node 48 is increasing (in a negative direction). In an alternative exemplary embodiment wherein the current-limit set point is decreased with positive-going VIN, diode 88 may be reversed.

A graphical representation 102 of a negative-going increase in input voltage at negative VIN node 48 followed by a positive-going decrease in input voltage is shown in FIG. 4. A graphical representation 104 is also shown of the resultant transient increase at the (−) input to amplifier 96. This waveform would be reflected in a similar transient increase of the variable current generated by variable current source 78, and therefore of E1. As E1 shows a positive increase, the offset voltage (−VIN)+E1 shows a transient increase.

Hot-swap controller current-limit settings are normally chosen to prevent load disconnect at the maximum operating current expected in the load, while a doubling (or less) of the load current is often considered to be a fault condition where the load should be disconnected. This is appropriate when the input voltage is fixed. However, when the input voltage VIN experiences a large change in voltage in a very short time, the output or load capacitor must be charged to the new value. Quickly changing the output capacitor voltage requires a significant transient increase in input current that could be considerably higher than the D-C load current itself. One approach is to limit the output voltage rate of change, even in the presence of a high rate of change of input voltage. This may be accomplished by, for example, an external gate capacitor attached to the gate of MOSFET pass transistor 56. The exemplary embodiments disclosed herein can be used in combination with or in place of the prior art methods to allow more rapid output-capacitor charge without causing a current-limit fault.

Internal switching circuits could be employed to create a transient applied to the (−) input of amplifier A1 at the end of the startup delay. This would briefly increase the current-limit trip points to allow increased current flow to initially charge the output capacitor without causing a current-limit fault at startup.

The values of capacitor 86, and resistors 82, 84, and 90 control the duration and degree of the increase in current-trip points with rate of change of input voltage as expressed below:

$$\Delta VIN/\Delta t$$

Resistor 90 may be selected to set the time required to reestablish positive-step protection following a negative step. In certain alternate non-limiting exemplary embodiments, negative-step-sensitive switching circuit may replace resistor 90 if desired to effect immediate reset.

Figure 5:
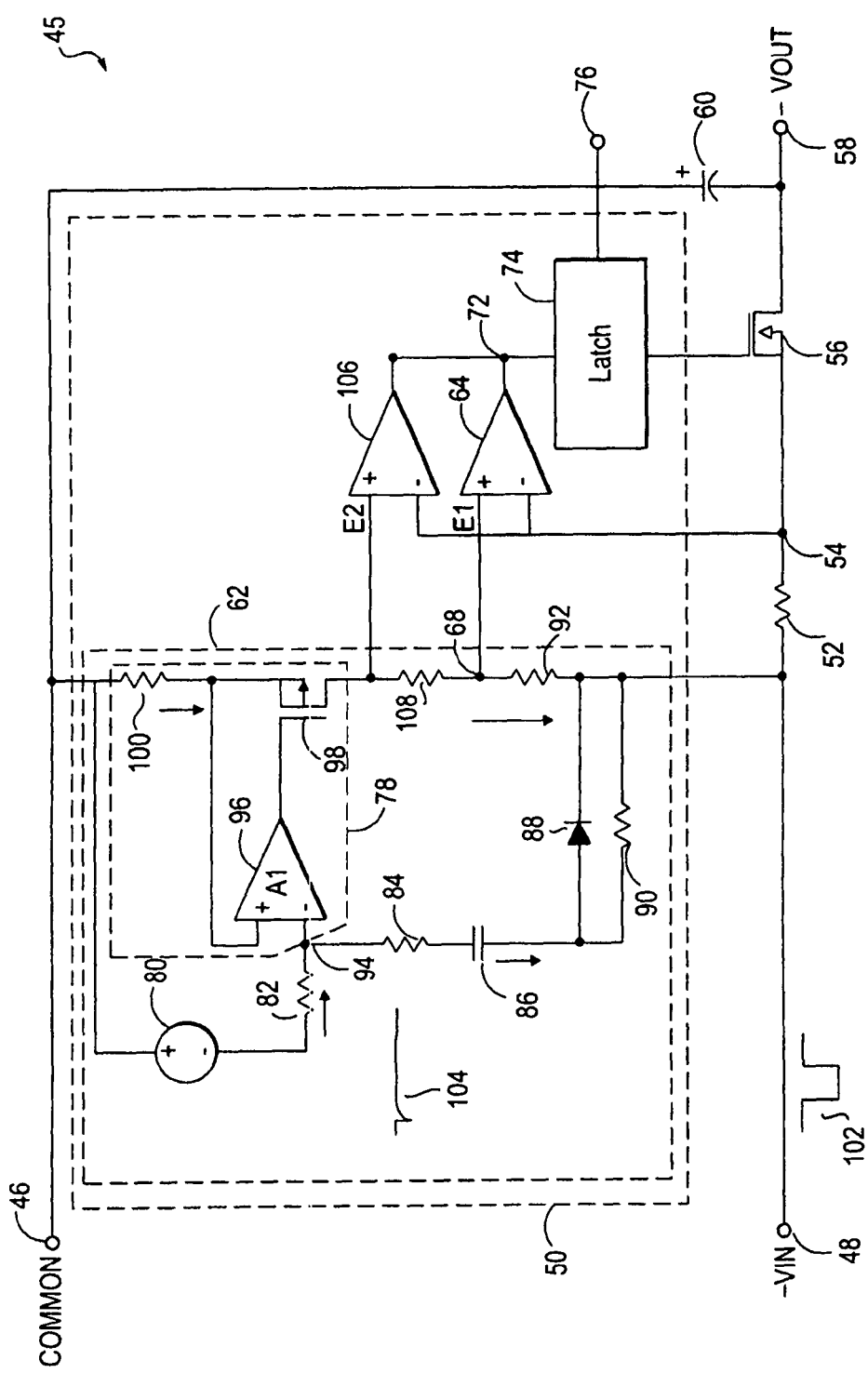
FIG. 5 is a schematic diagram depicting an alternative exemplary embodiment wherein a variable voltage source outputs a plurality of different voltages.

FIG. 5 is a schematic diagram depicting an alternate non-limiting exemplary embodiment of adaptive current limiter 45. This embodiment includes comparator 106 and resistor 108, and is also configured differently with respect to variable voltage source 62, variable current source 78, MOSFET 98, resistor 92, node 68 and comparator 64.

Variable voltage source 62 is disposed to generate two variable reference voltages, E1 and E2, at the (+) inputs of comparators 64 and 106 respectively. Variable current source 78, and more specifically the drain of MOSFET 98 is coupled to resistor 108 and to a (+) input of comparator 106. Resistor 108 is coupled to node 68 which is coupled to resistor 92 and to the (+) input of comparator 64. As will be appreciated by those skilled in the art, resistors 108 and 92 comprise a voltage divider in this configuration.

Comparator 64 is, in certain embodiments, a slow-acting comparator, whereas comparator 106 is a fast-acting comparator. Variable reference voltage E2 is generated by current flowing through both resistors 108 and 92 in series, whereas variable reference voltage E1 is generated by the same current flowing through resistor 92. Thus, variable reference voltage E2 is greater than variable reference voltage E1. This dual comparator configuration provides a fast acting current-trip point which interrupts load current flow when extreme current levels are reached, while preventing premature interruption at lower current levels.

Application of various alternate embodiments of adaptive current limiter 45 include the turn-on period when the output capacitor is initially charged from zero to full voltage. At this time, the input voltage negative VIN is typically steady or nearly steady so no input transient is available because a time delay has occurred after connection to negative VIN, and the output voltage is slowly ramped up to charge the output capacitor 60 at moderate current.

Further alternate embodiments include various combinations of components shown above as internal to integrated circuit 50 being disposed externally to integrated circuit 50. For example resistor 84, resistor 82, or capacitor 86 could be disposed externally to allow for design variation in the value of load capacitor 60.

Figure 6:
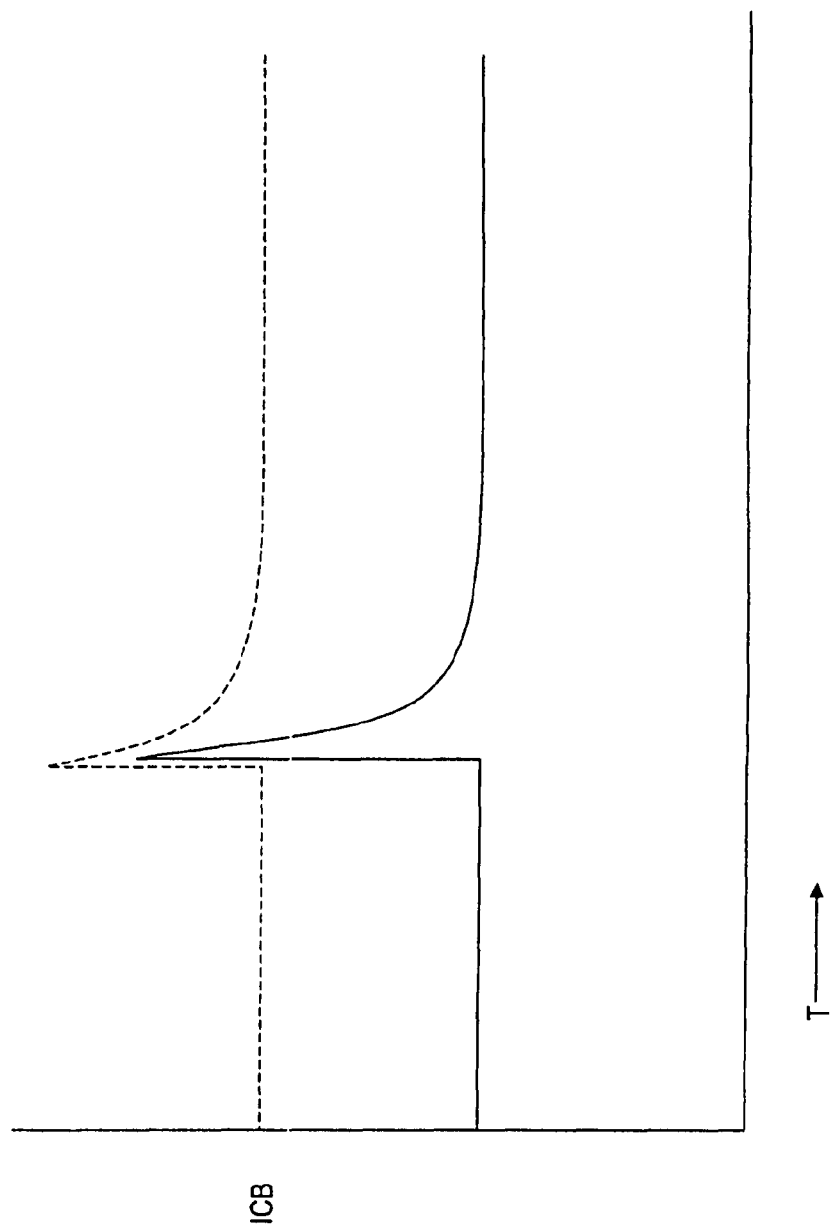
FIG. 6 is a diagram depicting the operation of an adaptive current limiter which is responsive to transient power events such as that induced by the addition of a power source.

FIG. 6 is a graph depicting an example of current flow, depicted by the solid line, during a transient increase in current caused by the addition of a power source with a concomitant step in input voltage, and an adaptive current-limit set point as described herein depicted by the dashed line. The vertical axis represents current level, and the horizontal axis represents time, increasing from left to right. Both the current flow and the current limit rise sharply in response to the aforementioned increase in voltage, and both decay exponentially over time. As can be seen in FIG. 6, a current level which would have caused a premature over-voltage condition with a fixed current-limit set point does not cause such a condition with an adaptive current-limit set point as described herein. As will be appreciated by those skilled in the art, the rate of decay for the adaptive current-limit set point can be tuned so that it returns to its normal level quickly enough to prevent a prolonged over-voltage condition, but not so quickly that it intersects with the load current level causing premature circuit breakage during a transient surge caused by the addition of a power source. Although one current-set point is depicted, persons of skill in the art will appreciate that a plurality of set points in combination with comparators having varying response times is contemplated herein.

Although various embodiments have been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An adaptive current limiter comprising:
   a first input node and a second input node;
   a circuit breaker;
   a sensing resistor coupling said first input node to said circuit breaker;
   a variable reference voltage generator coupled between said first input node and said second input node which develops a first reference voltage including a step with exponential decay in response to a transient surge;
   a first comparator having a first input node coupled to a circuit breaker side of said sensing resistor and a second input node coupled to said variable reference voltage, said comparator having a variable circuit breaker voltage output coupled to said circuit breaker, said variable circuit breaker voltage providing a current limit set point for said circuit breaker; whereby said current limit set point for said circuit breaker is temporarily increased during a transient surge; and a second comparator coupled to said second variable reference voltage which is faster than said first comparator to provide a higher transient current limit set point for said circuit breaker.

2. An adaptive circuit limiter as recited in claim 1 wherein said variable reference generator includes a variable current source having a first differential input which is coupled to an RC circuit.

3. An adaptive circuit limiter as recited in claim 2 wherein said RC circuit includes a series connection of a charging resistor coupled to said first differential input and a capacitor coupled to said first node.

4. An adaptive circuit limiter comprising:
a first input node and a second input node;
a circuit breaker;
a sensing resistor coupling said first input node to said circuit breaker;
a variable reference voltage generator coupled between said first input node and said second input node which develops a voltage step with exponential decay in response to a transient surge, wherein said variable reference voltage generator includes a variable current source having a first differential input which is coupled to an RC circuit including a series connection of a charging resistor coupled to said first differential input and a capacitor coupled to said first node;
a comparator having a first input node coupled to a circuit breaker side of said sensing resistor and a second input node coupled to said variable reference voltage, said comparator having a variable circuit breaker voltage output coupled to said circuit breaker, said variable circuit breaker voltage providing a current limit set point for said circuit breaker; whereby said current limit set point for said circuit breaker is temporarily increased during a transient surge; and
a directional valve coupling said capacitor to said first node.

5. An adaptive circuit limiter as recited in claim 4 wherein said directional valve comprises a diode.

6. An adaptive circuit limiter as recited in claim 4 further comprising a shunt resistor coupled in parallel with said directional valve.

7. An adaptive current limiter as recited in claim 2 wherein said variable current source comprises a comparator having said first differential input coupled to said second node by a series connection of a reference voltage source and a resistor.

8. An adaptive current limiter as recited in claim 7 wherein said comparator includes a second differential input, and wherein said variable voltage source further comprises the series connection of a first resistor, a valve, and a second resistor coupled between said first node and said second node, where said second differential input is coupled to a node between said second resistor and said valve, and where an output of said variable voltage source at a node between said valve and said first resistor.

* * * * *